US012053909B2

(12) United States Patent
Haas et al.

(10) Patent No.: US 12,053,909 B2
(45) Date of Patent: Aug. 6, 2024

(54) FIBER-REINFORCED SOLUBLE CORE

(71) Applicants: Technische Universitat Munchen, Munich (DE); Apppex Product Development Prototypes Parts GmbH, Munich (DE); Haas Metallguss GmbH, Muhlhausen (DE)

(72) Inventors: Michael Haas, Boll (DE); Frank Breitinger, Munich (DE); Dominik Boos, Allershausen (DE); Swen Zaremba, Unterföhring (DE)

(73) Assignees: TECHNISCHE UNIVERSITAT MUNCHEN, Munich (DE); Apppex Product Development Prototypes Parts GmbH, Munich (DE); Haas Metallguss GmbH, Muhihausen (DE)

( * ) Notice: Subject to any disclaimer, the term of this patent is extended or adjusted under 35 U.S.C. 154(b) by 180 days.

(21) Appl. No.: 17/471,461

(22) Filed: Sep. 10, 2021

(65) Prior Publication Data

US 2022/0111563 A1    Apr. 14, 2022

(30) Foreign Application Priority Data

Oct. 13, 2020   (EP) .................................. 20 201 634

(51) Int. Cl.
*B29C 33/38*   (2006.01)
*B22C 9/10*   (2006.01)
*B29C 33/76*   (2006.01)
*B33Y 80/00*   (2015.01)

(52) U.S. Cl.
CPC ............ *B29C 33/3842* (2013.01); *B22C 9/10* (2013.01); *B29C 33/76* (2013.01); *B33Y 80/00* (2014.12)

(58) Field of Classification Search
CPC ... B29C 67/202; B29C 33/76; B29C 33/3842; B29C 33/3828; B29C 53/82; B29C 41/10; B22C 9/10
See application file for complete search history.

(56) References Cited

U.S. PATENT DOCUMENTS

| | | | | |
|---|---|---|---|---|
| 4,076,656 A | * | 2/1978 | White | .................. B29C 67/202 521/64 |
| 4,199,864 A | * | 4/1980 | Ashman | .............. A61F 2/30767 433/175 |
| 4,383,956 A | * | 5/1983 | Croft | .......................... C08J 9/26 264/49 |

(Continued)

FOREIGN PATENT DOCUMENTS

| | | |
|---|---|---|
| CN | 106 751 450 A | 5/2017 |
| CN | 106 182 645 A | 12/2019 |

(Continued)

OTHER PUBLICATIONS

European Search Report dated Mar. 3, 2021, issued in EP Application No. EP 20201634, filed Oct. 13, 2020.

*Primary Examiner* — Emmanuel S Luk
(74) *Attorney, Agent, or Firm* — Workman Nydegger

(57) ABSTRACT

A method of manufacturing a core for a production process and to a core manufactured in accordance with the method are provided. The method includes providing a mold containing a soluble substance and one or more fibers and causing the soluble substance to solidify around the one or more fibers.

10 Claims, 16 Drawing Sheets

(56) References Cited

U.S. PATENT DOCUMENTS

| | | | | | |
|---|---|---|---|---|---|
| 4,962,003 | A | * | 10/1990 | Lhymn | B22F 5/007 |
| | | | | | 420/559 |
| 5,846,368 | A | * | 12/1998 | Sakaguchi | B60R 13/0225 |
| | | | | | 156/198 |
| 6,227,805 | B1 | * | 5/2001 | Besse | B29C 70/86 |
| | | | | | 416/226 |
| 6,488,871 | B2 | * | 12/2002 | Nomura | B29C 45/0005 |
| | | | | | 264/6 |
| 9,011,747 | B2 | * | 4/2015 | Tateyama | B29C 43/34 |
| | | | | | 264/257 |
| 9,085,665 | B1 | * | 7/2015 | Chang | B29C 67/202 |
| 10,945,854 | B2 | * | 3/2021 | Roeder | A61L 27/46 |
| 11,179,243 | B2 | * | 11/2021 | Roeder | A61L 27/26 |
| 2002/0135161 | A1 | * | 9/2002 | Lamb | B60K 37/00 |
| | | | | | 280/728.3 |
| 2003/0096661 | A1 | * | 5/2003 | Kim | B29C 43/36 |
| | | | | | 473/351 |
| 2006/0121269 | A1 | * | 6/2006 | Miller | B01D 71/26 |
| | | | | | 428/315.7 |
| 2010/0044912 | A1 | * | 2/2010 | Zahlen | B29C 33/505 |
| | | | | | 264/219 |
| 2015/0374477 | A1 | * | 12/2015 | Chang | A61L 27/56 |
| | | | | | 600/431 |
| 2017/0151712 | A1 | * | 6/2017 | La Forest | B29C 64/118 |
| 2022/0080630 | A1 | * | 3/2022 | Farris | A61F 2/3094 |

FOREIGN PATENT DOCUMENTS

| | | |
|---|---|---|
| JP | H07-316379 A | 12/1995 |
| WO | 1993/25365 A1 | 12/1993 |
| WO | 2020/127980 A1 | 6/2020 |

\* cited by examiner

FIBER-REINFORCED SOLUBLE CORE

CROSS-REFERENCE TO RELATED APPLICATIONS

This application claims priority to European Application No. EP 20 201 634.1, filed Oct. 13, 2020, which is incorporated herein by specific reference.

BACKGROUND OF THE INVENTION

1. The Field of the Invention

The present disclosure relates to soluble cores. In particular, the present disclosure relates to soluble cores which are reinforced with matter that is insoluble in the solvent of the soluble core.

2. The Relevant Technology

Using expendable cores allows for more complex geometries, including internal passages and cavities, that could not be produced when using re-usable (demoldable) cores.

SUMMARY OF THE INVENTION

The present disclosure is directed at a method of manufacturing a core for a production process, a core so manufactured, methods of manufacturing articles in which the core (so manufactured) may be used and systems for manufacturing molded articles in which the methods may be practiced.

The method of manufacturing a core for molding comprises providing a mold containing a soluble substance and one or more fibers and causing the soluble substance to solidify around the one or more fibers.

In this regard, the term "core", as used throughout the description and the claims, particularly refers to a mold insert which may be used to form the internal shape (or features) of a molded article (cast part). The core may be an expendable (or lost) core. I.e., the core may be destructed when removing the core from the molded article and the core may be designed so that the destruction is not likely to damage the molded article. Destructing the core may be necessary if otherwise withdrawing the core from the molded article would be inhibited by the geometry of the article's internal shape (or features). For example, the expendable core may be placed inside a mold to form internal passages or cavities of the molded article.

Moreover, the term "core", as used throughout the description and the claims, may also refer to a core which is used for additive manufacturing (e.g., Automated Fiber Placement (AFP), 3-D printing), wrapping, winding and braiding of dry (preform) or pre-impregnated fibers, as a replacement for Ceramic Matrix Composites (CMC) or other ceramic raw materials, or compression molding (of plastics) using Sheet Molding Compound (SMC) or Bulk molding Compound (BMC).

Moreover, the term "molding", as used throughout the description and the claims, particularly refers to filling a mold with a liquid and causing (or having provided for) conditions under which the liquid begins to solidify. For example, a liquid metal alloy may be injected (under high pressure) into the mold and start to solidify when the temperature of the alloy decreases below a melting temperature. The alloy may comprise aluminum, magnesium, or zinc. Once solidification has sufficiently progressed, the molded article formed by the hardening/hardened alloy may be removed from the mold. In another example, a (reactive) resin may be injected into the mold in a Resin Transfer Molding® or injection molding process.

In this regard, the term "mold", as used throughout the description and the claims, particularly refers to mold parts (for instance, two mold halves) which when put together form a mold cavity, the shape of which defines (at least partially) the external shape of the molded article. The molded article may be removed from the mold by disassembling the mold parts and/or withdrawing the molded article from a mold part to which it adheres. Furthermore, the term "soluble substance", as used throughout the description and the claims, particularly refers to a crystalline substance which can be dissolved in water, alcohols, petrol, aromatic compounds, acetone or aqueous acids/leaches or a mixture of these. The soluble substance may comprise cations and anions. For example, the soluble substance may be a water-soluble substance such as a salt (e.g., an alkali salt) and the one or more fibers may be water insoluble. The soluble substance may also be a water-soluble substance which is mixed with a water-insoluble substance such as sand (as a filler).

The method may further comprise using the core to produce an article and dissolving the soluble substance in a solvent, wherein the article does not dissolve in the solvent. I.e., the produced article may be resistant to the solvent such that the article is not damaged when the core is removed from the article.

The production process may be a molding process, an additive manufacturing process, 3D printing, automated fiber placement with in-situ consolidation, automated tape laying, dry or wet filament winding, braiding, or preforming of a composite part or a final part (=article) with the same characteristics of the core.

The method may further comprise producing an article by using the core in the production process, wherein the core is insoluble in a material of the article.

Moreover, the term "fiber", as used throughout the description and the claims, particularly refers to a lengthy strand of material. The material may be produced by plants, animals, or geological processes (and modified by a chemical process), or the material may be produced by a physical process (e.g., production of glass fibers), a chemical process, or a combination of both (e.g., application of sizing to glass fibers). For example, the core may be reinforced by one or more abaca fibers, coir fibers, cotton fibers, linen fibers, flax fibers, bamboo fibers, hemp fibers, jute fibers, ramie fibers, sisal fibers, wool fibers, silk fibers, harakeke fibers, alfa fibers, hair, fur, aramid fibers, carbon fibers, glass fibers, ceramic fibers (e.g., silicon carbide fibers, alumina fibers, graphite fibers, etc.), basalt fibers, metal fibers (e.g., iron, steel, tungsten, nickel, titan, aluminum etc.), etc.

The strand may be of substantially constant thickness and/or cross-sectional shape. The length of the strand may be more than 10, more than 100, or more than 1000 times the thickness of the strand. The one or more fibers may have a length of more than 1 mm, more than 2 mm, more than 3 mm, more than 4 mm, more than 5 mm, more than 6 mm, more than 7 mm, more than 8 mm, more than 9 mm, more than 10 mm, more than 20 mm, more than 30 mm, more than 40 mm, more than 50 mm, more than 75 mm, more than 100 mm, more than 200 mm, more than 300 mm or more than 1000 mm. The fibers may be continuous/endless fibers. A length of one or more of the fibers may be equal to or exceeding one or more dimensions (e.g., the length, the width and/or the height) of the core. Multiple fibers may be (mechanically, thermally or chemically) interlocked to form a yarn. The fibers (or yarns) may form a textile or roving. For example, the fibers (or yarns) may form a (woven or nonwoven) fabric. The core may comprise multiple layers of textile/fabric. The layers may be interlocked (e.g., by stitching).

The one or more fibers (or yarns) may form a three-dimensional structure (e.g., a mesh or a preform). The three-dimensional structure may comprise tetrahedra, quadrilateral pyramids, triangular prisms, hexahedra, etc. The three-dimensional structure may be formed by 3D-printing. 3D-printing may involve immersing a printing head (nozzle) into an (aqueous) solution comprising the soluble substance and extruding the fiber material into the solution. The material from which the three-dimensional structure is formed may be unevenly distributed throughout the core to (only or particularly) reinforce a part/portion of the core which is expected to experience (relatively) high stress (during molding).

For example, the three-dimensional structure may reinforce an interlocking connection between the core and the mold. For instance, the three-dimensional structure may be wound around (e.g., in the form of a form a ring, loop or helix) an attachment portion (recess) into which a pin (of the mold) is to be inserted when attaching the core to the mold.

In addition, the formulation "solidifying around the one or more fibers", as used throughout the description and the claims, particularly refers to a scenario in which the soluble substance forms a matrix in which the one or more fibers are embedded. The soluble substance may adhere to the one or more fibers. If the material of the one or more fibers is porous or allows diffusion of the soluble substance, the soluble substance may extend into pores of the one or more fibers or extend into the fiber material by diffusion. If the core is exposed to stress, a tensile strength of the one or more fibers may prevent the core from breaking. Moreover, the fibers may exhibit a relatively high tensile strength and a relatively low resistance against bending.

The method may further comprise determining a targeted value of a physical property (e.g., a thermo-mechanical property) of at least a part of the core, wherein the physical property is selected from the group consisting of, a thermal expansion coefficient of the part, a thermal conductivity of the part, a bending strength of the part, a crack sensitivity of the part, a resistance to thermo-shock of the part, and a maximum strain the part is capable of withstanding, and selecting the soluble substance, a material of the one or more fibers, a length of the one or more fibers, and a mass fraction of the material, in accordance with the targeted value.

For example, the susceptibility of the core to thermal expansion may be decreased (as compared to the susceptibility of the soluble substance to thermal expansion) and the thermal conductivity may be increased (as compared to the thermal conductivity of the soluble substance). Likewise, the bending strength may be increased, the crack sensitivity may be decreased, the resistance to thermo-shock may be increased, and the maximum strain the part is capable of withstanding may be increased.

This may simplify the formation of an internal shape of a molded article with high accuracy and stability and reduce the time required to heat/cool the core.

A least one of, the material of the one or more fibers, the length of the one or more fibers, the textile type of the one or more fibers, the orientation/alignment of the one or more fibers and the mass fraction of the material (i.e., the relation between the fiber material and the material mix of which the core is made) may differ between different parts of the core in accordance with differing targeted values of the physical properties of the parts.

For example, the core may be divided into two or more parts and a part that is expected to experience the highest stress may have longer fibers and/or a higher mass fraction of the material than any other part. If the fibers are unevenly distributed throughout the core, the core may be dividable into two parts that have the same volume but differ substantially (e.g., by more than 5%, more than 10%, more than 25%, more than 50% more than 70%) in regard to a mass fraction of the fiber material in either one of the parts.

The method may further comprise rating different parts of the core regarding an expected stress-level during molding and arranging the one or more fibers in one or more parts having a relatively high expected stress level along a direction of an internal force that is expected to cause the stress.

In other words, the fibers may be arranged to counteract a tensile force acting in the core.

Arranging the fibers within the core may also comprise aligning the fibers.

The mold may contain solid particles of the soluble substance dispersed in a saturated solution comprising the substance and its solvent.

For example, the mold may contain a slurry made from salt particles and a (saturated) aqueous solution (e.g., salt dissolved in water). The salt particles may be less than 1 mm, less than 500 µm, less than 250 µm or less than 125 µm in size (thus passing through a 1 mm, a 500 µm, a 250 µm, and a 125 µm sieve, respectively). 40%, 60%, 90%, or 100% of the particles may have a grain size that is smaller than a fiber diameter, in order to provide good filling and a build-up of a fiber-matrix interface in between the fiber(s) and the salt.

The method may further comprise withdrawing vapor of the solvent from the mold.

For example, the vapor may be withdrawn through one or more clearances between two or more parts of the mold, or the mold may comprise one or more porous sections which are formed by a gas-permeable and liquid-impermeable, or by a gas-permeable and liquid-permeable porous structure.

The mold may be heated and/or the aqueous solution may be exposed to a reduced-pressure atmosphere (e.g., by placing the mold in a vacuum) to increase a rate at which the vapor is withdrawn from the mold.

The mold may be placed in an at least partially flexible gas-impermeable hull (or pouch) which is evacuated. The vapor may be withdrawn through a (woven or nonwoven) fabric (or through another porous gas-permeable structure) connecting the one or more clearances or the one or more porous sections to one or more openings in the at least partially flexible hull through which the vapor is discharged from the at least partially flexible hull. The fabric avoids that the flexible hull blocks or obstructs the path along which the vapor is to be discharged.

Furthermore, a pressure may be applied to parts of the mold such that the parts are urged towards each other.

The method may further comprise heating the soluble substance, wherein the soluble substance is caused to solidify around the one or more fibers by cooling the soluble substance.

The heating may be performed to melt the soluble substance after it has solidified around the one or more fibers due to vapor being withdrawn from the mold or instead of providing for an aqueous solution in the mold and withdrawing vapor from the mold.

The core comprises a matrix formed by the soluble substance and the one or more fibers embedded in the matrix.

This allows removing/dissolving the core by the solvent.

The fiber volume ratio may be above 0.05, 0.1, 0.2 or 0.3.

The material of the fibers and/or the length of the fibers may differ between different parts of the core.

The fibers may be unevenly distributed within the core. As describe above, the core may be dividable into two parts that have the same volume, but differ substantially (e.g., by more than 5%, more than 10%, more than 25%, more than 50%, more than 70%) with regard to a mass fraction of the fiber material in either one of the parts.

The one or more fibers may be concentrated around an attachment portion of the core.

The method of manufacturing molded articles may comprise providing a mold having the core (made of the fiber-reinforced soluble substance), flowing a material into the mold, and dissolving the soluble substance with the solvent after the material has begun to harden.

For example, as described above, a liquid metal alloy or plastic melt may be injected (under high pressure) into the mold and start to solidify when the temperature of the alloy/melt decreases below a melting temperature. Once solidification has sufficiently progressed, the molded article formed by the hardening/hardened alloy may be removed from the mold. The core may then be removed from the molded article by dissolving the soluble substance with the solvent, preferably (hot) water or water vapor.

If the fibers are small compared to an opening in the molded article through which the core material is removed from the core, the fibers may be simply be washed out with the dissolved soluble substance. If the fibers (or yarns) form a textile or multiple layers of textile that are interlocked or if the one or more fibers (or yarns) form a three-dimensional structure that does not fit through the opening, the one or more fibers may be otherwise pushed/pulled out through the opening (e.g., using a rigid element or pressured air).

The method may further comprise re-using the soluble substance and the fibers for manufacturing one or more further cores.

For example, the solvent may be withdrawn from the dissolved soluble substance and the crystallized soluble substance may be milled and sieved (as describe above) for reuse.

The system for manufacturing molded articles may comprise a nozzle, wherein the nozzle is connected to a solvent source and configured to inject solvent into a molded article to dissolve a fiber-reinforced soluble core and a separator, wherein the separator is configured to separate fibers from a solution produced by dissolving the fiber-reinforced soluble core.

The separator may be a sieve, or, if the fibers are made of a ferro-magnetic material, an electro- or a permanent magnet.

The system may further comprise an extractor, wherein the extractor is configured to extract a soluble substance from the solution.

For example, the extractor may heat the solution (e.g., to evaporate the solvent).

The system may further comprise a mill, wherein the mill is configured to mill the soluble substance.

The milled soluble substance and the separated fibers may be reused for molding one or more further fiber-reinforced soluble cores.

BRIEF DESCRIPTION OF THE DRAWINGS

The foregoing aspects and many of the attendant advantages will become more readily appreciated as the same becomes better understood by reference to the following description of embodiments, when taken in conjunction with the accompanying drawings, wherein like reference numerals refer to like parts throughout the various views, unless otherwise specified.

Notably, the drawings are not drawn to scale and unless otherwise indicated, they are merely intended to conceptually illustrate the structures and procedures described herein.

DETAILED DESCRIPTION OF THE PREFERRED EMBODIMENTS

Figure 1:
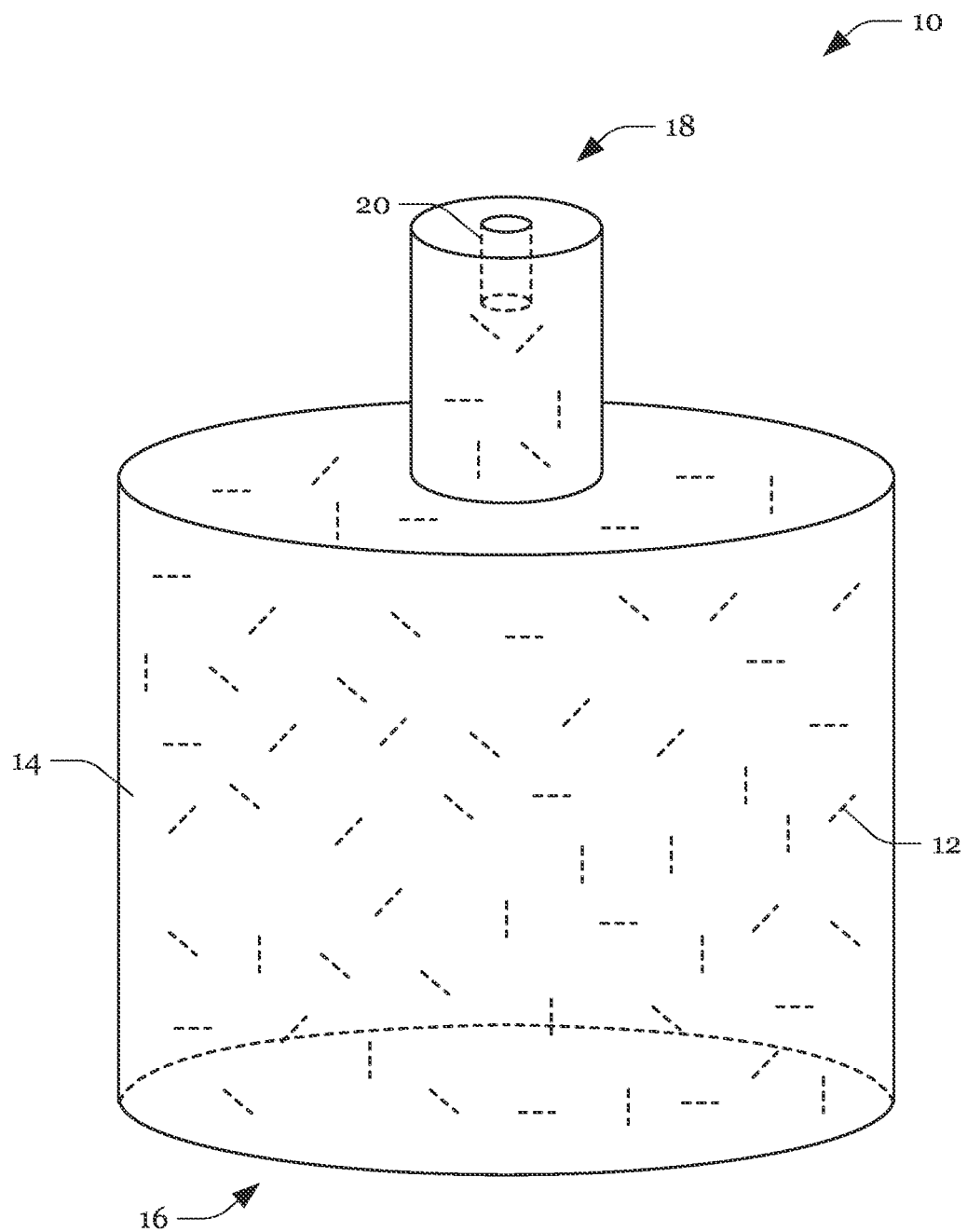
FIG. 1 schematically illustrates a fiber-reinforced core according to a first example.

FIG. 1 shows core 10 which is reinforced by fibers 12. Fibers 12 may have a length of more than 1 mm. Fibers 12 are embedded in matrix 14 which is formed by soluble substance 16 (e.g., a water-soluble alkali salt) that has solidified (crystallized) around fibers 12. The fiber material and the mass fraction of the fiber material may be determined based on a targeted strength, a targeted thermal expansion coefficient, and a targeted thermal conductivity of core 10. To this end, the selected fiber material may exhibit a substantially lower thermal expansion coefficient than soluble substance 16, and a substantially higher thermal conductivity than soluble substance 16. For example, the selected fiber material may exhibit a thermal expansion coefficient which is (at room temperature) 10% lower than a thermal expansion coefficient of soluble substance 16, and a thermal conductivity which is (at room temperature) 10% higher than a thermal conductivity of soluble substance 16. The mass fraction may be between 0.01 and 0.7 and preferably between 0.1 and 0.5.

Core 10 comprises attachment portion 18 for attaching core 10 to a mold (as will be discussed in more detail further below with regard to FIG. 7). Attachment portion 18 has recess 20, into which a pin of the mold can be inserted. Although core 10 is shown with only one attachment portion 18, core 10 may comprise multiple attachment portions 18 (e.g., attachment portions 18 at opposite sides of core 10). Moreover, attachment portion 18 may be modified in various ways including having a cubical shape as opposed to the cylindrical shape shown in the example. Likewise, the shape of core 10 may be modified depending on the internal shape or features of the article to be molded. For example, core 10 may not have a cylindrical shape as shown in FIG. 1 but a cubical shape, a shape of a bent tube, or any other shape.

Figure 2:
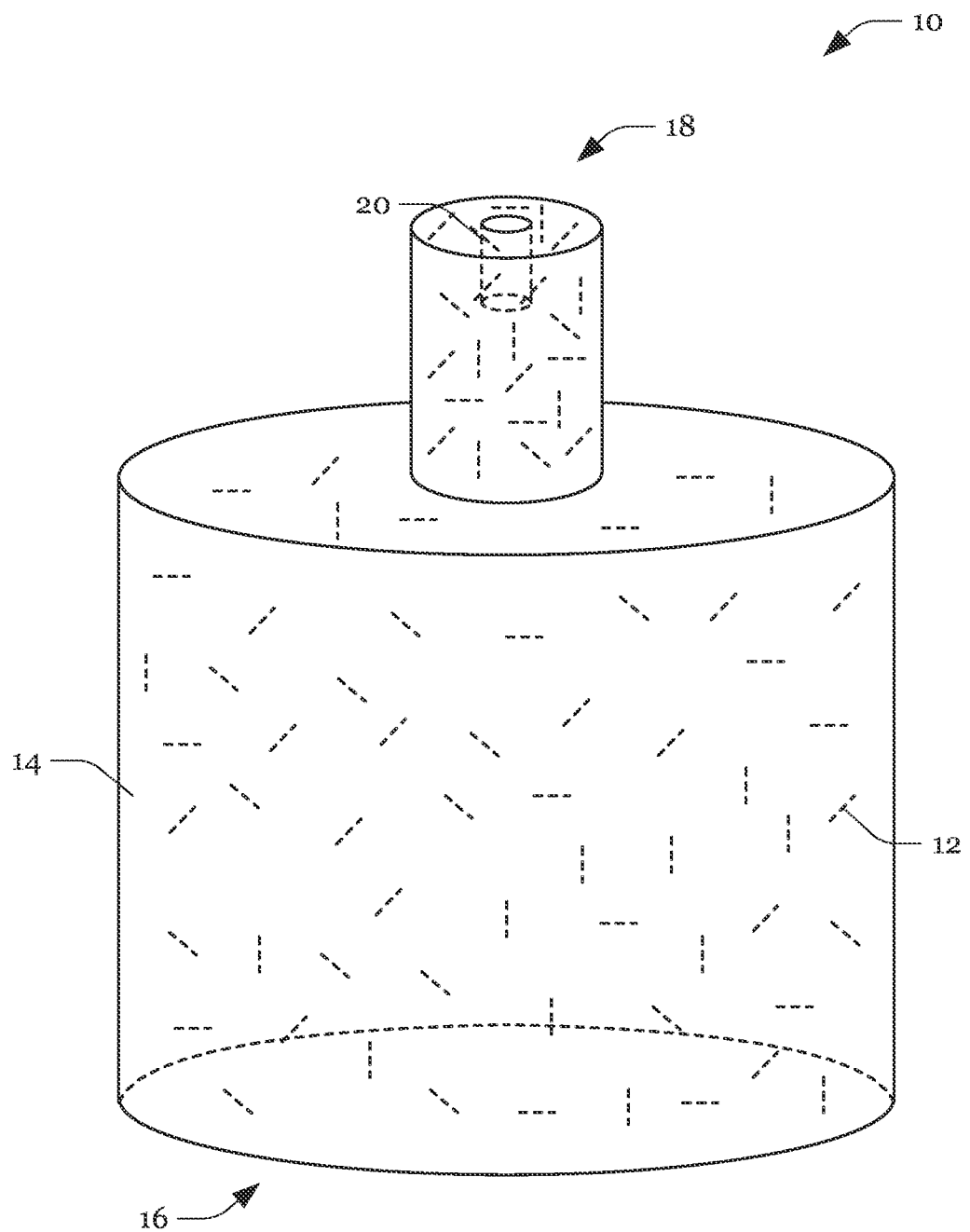
FIG. 2 schematically illustrates a modification of the fiber-reinforced core of FIG. 1.

As shown in FIG. 2, fibers 12 may be unevenly distributed within core 10 as opposed to being evenly distributed within core 10, as in FIG. 1. The uneven distribution may serve to particularly increase a strength of a part or portion of core 10 which is expected to experience relatively high stress during molding. As illustrated in FIG. 2, attachment portion 18 may be particularly strengthened. The uneven distribution may also serve to particularly increase a strength of a part or portion which would otherwise be substantially weaker than other parts or portions of core 10. The uneven distribution may further serve to improve a heat transport throughout core 10. For example, a relatively thin part or portion of core 10 may comprise relatively more fibers 12 than a relatively thick part or portion of core 10, to avoid that the relatively thin part or portion breaks during molding and/or to avoid that the relatively thin part or portion becomes a bottle neck with regard to heat transport. This may also serve to reduce tension in core 10 caused by an uneven temperature distribution during molding.

Figure 3:
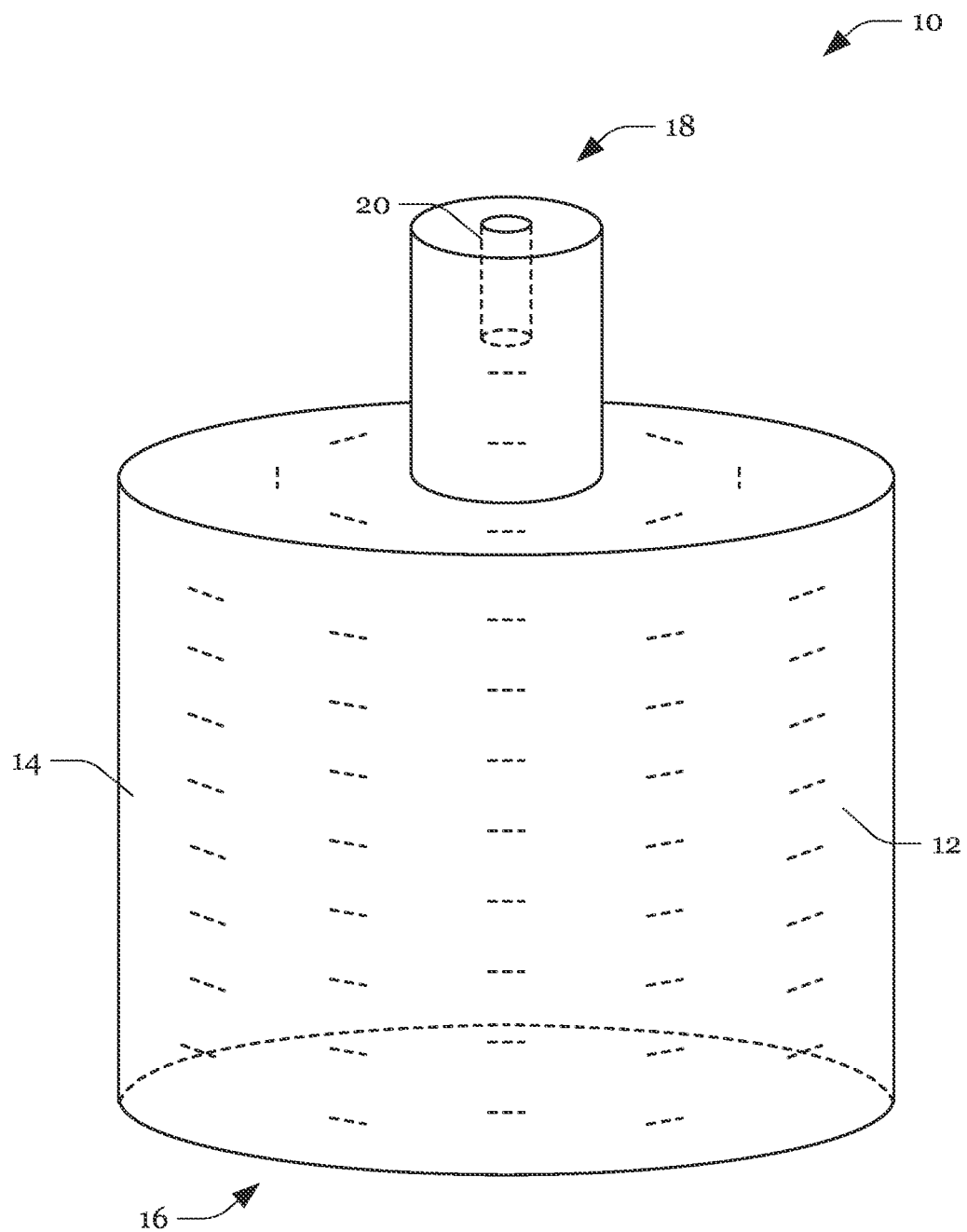
FIG. 3 schematically illustrates a fiber-reinforced core according to a second example.

As shown in FIG. 3, fibers 12 may be aligned. For example, an orientation of fibers 12 that are relatively close to each other may be nearly parallel, whereas an orientation of fibers 12 which are relatively far from each other may not. The alignment of fibers 12 may be beneficial if forces acting on core 12 during molding can be countered by the tensile strength of fibers 12. In other words, the alignment of fibers 12 may cause a longitudinal axis of fiber 12 to be perpendicular to a crack that would otherwise occur if fiber 12 would not counteract the (tensile) forces causing the crack.

Figure 4:
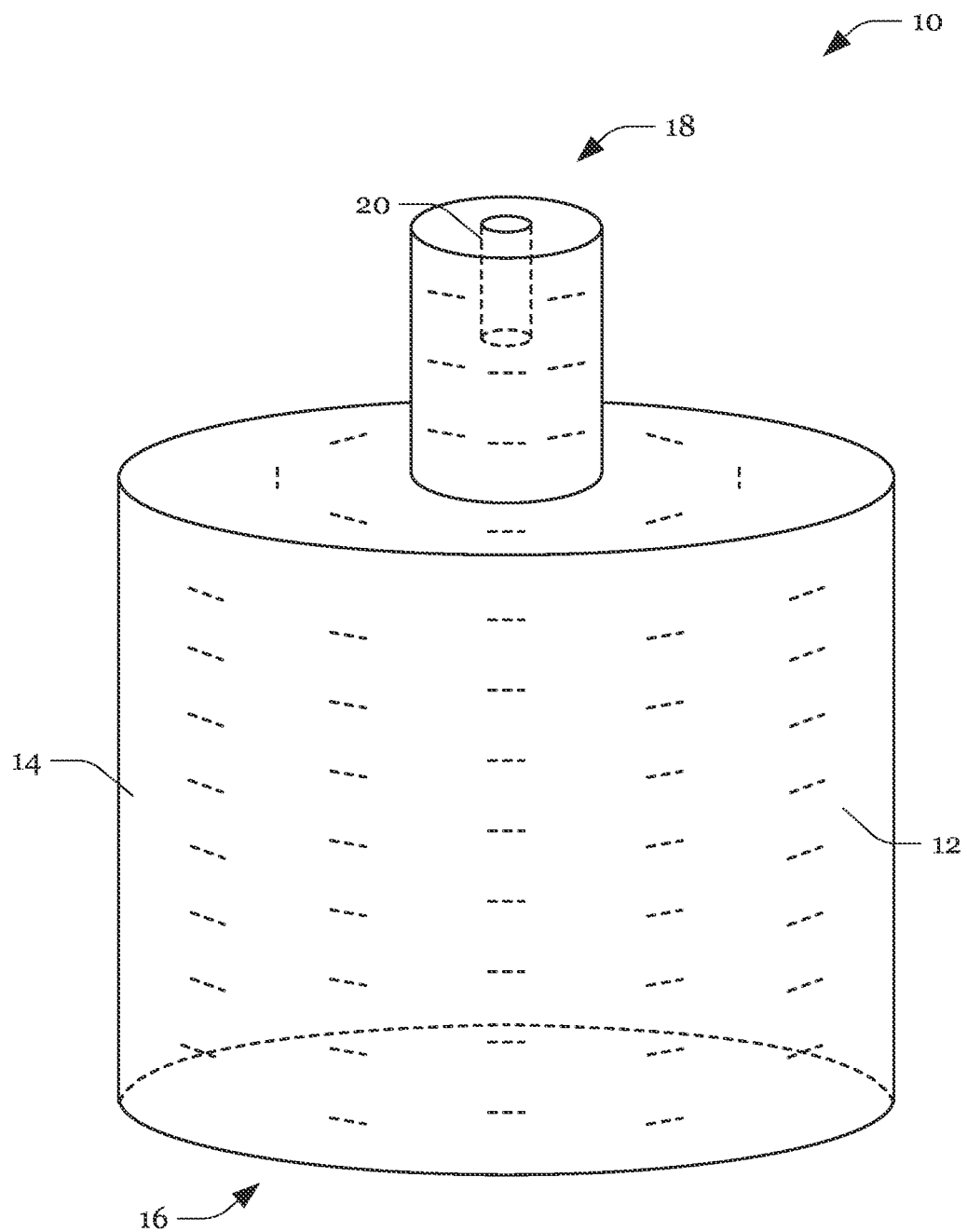
FIG. 4 schematically illustrates a modification of the fiber-reinforced core of FIG. 3.
Figure 5:
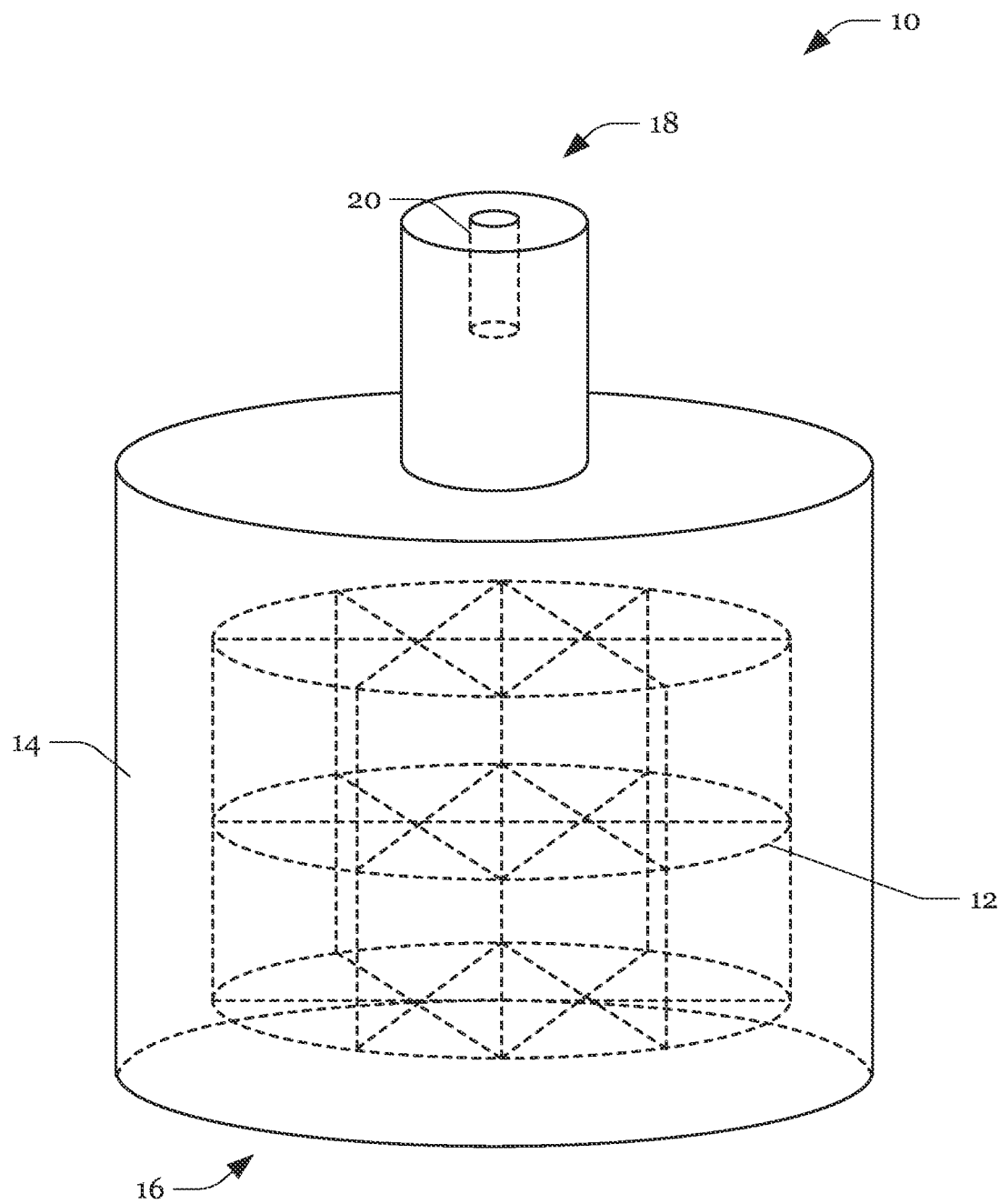
FIG. 5 schematically illustrates a fiber-reinforced core according to a third example.
Figure 6:
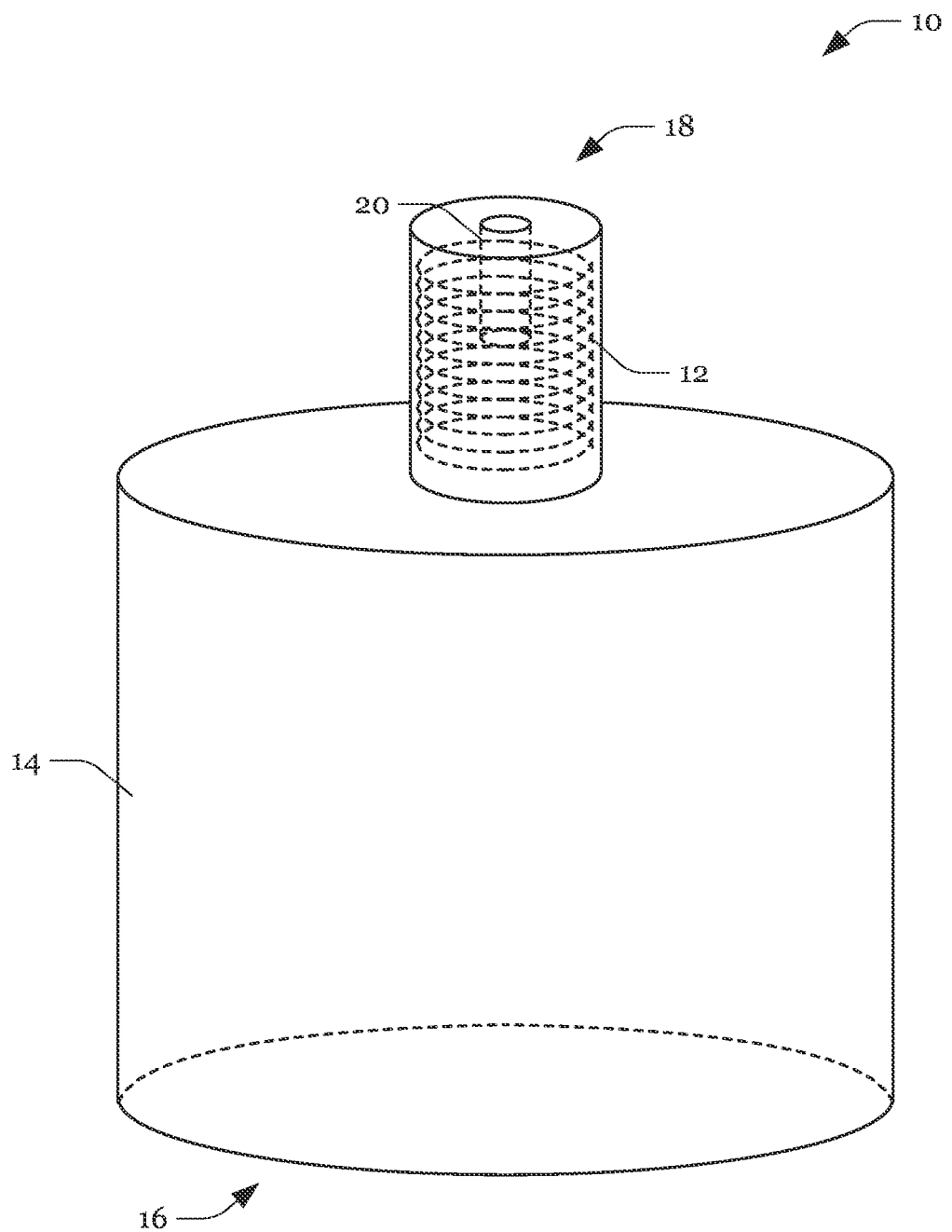
FIG. 6 schematically illustrates a fiber-reinforced core according to a fourth example.

As shown in FIG. 4, fibers 12 may be unevenly distributed within core 10 as opposed to being evenly distributed within core 10, as in FIG. 3, irrespective of the fact that some or all of fibers 12 may be aligned. An uneven distribution may be achieved by avoiding a migration of fibers 12 between different core 12 segments (e.g., due to viscosity) or segmenting core 10 using one or more fiber-impermeable barriers. As shown in FIG. 5, an uneven distribution may also be achieved by connecting fibers 12 to form one or more yarns and/or connecting fibers 12 (or the yarns) to form three-dimensional structure 22. Notably, three-dimensional structure 22 may also be formed by a single fiber or filament. For example, three-dimensional structure 22 may be 3D-printed and integrated into core 10. As shown in FIG. 6, core 10 may also comprise only a single fiber 12 or filament that particularly reinforces a portion of core 12. For instance, single fiber 12 may be wound or braided around attachment portion 18 to particularly increase its strength.

Figure 7:
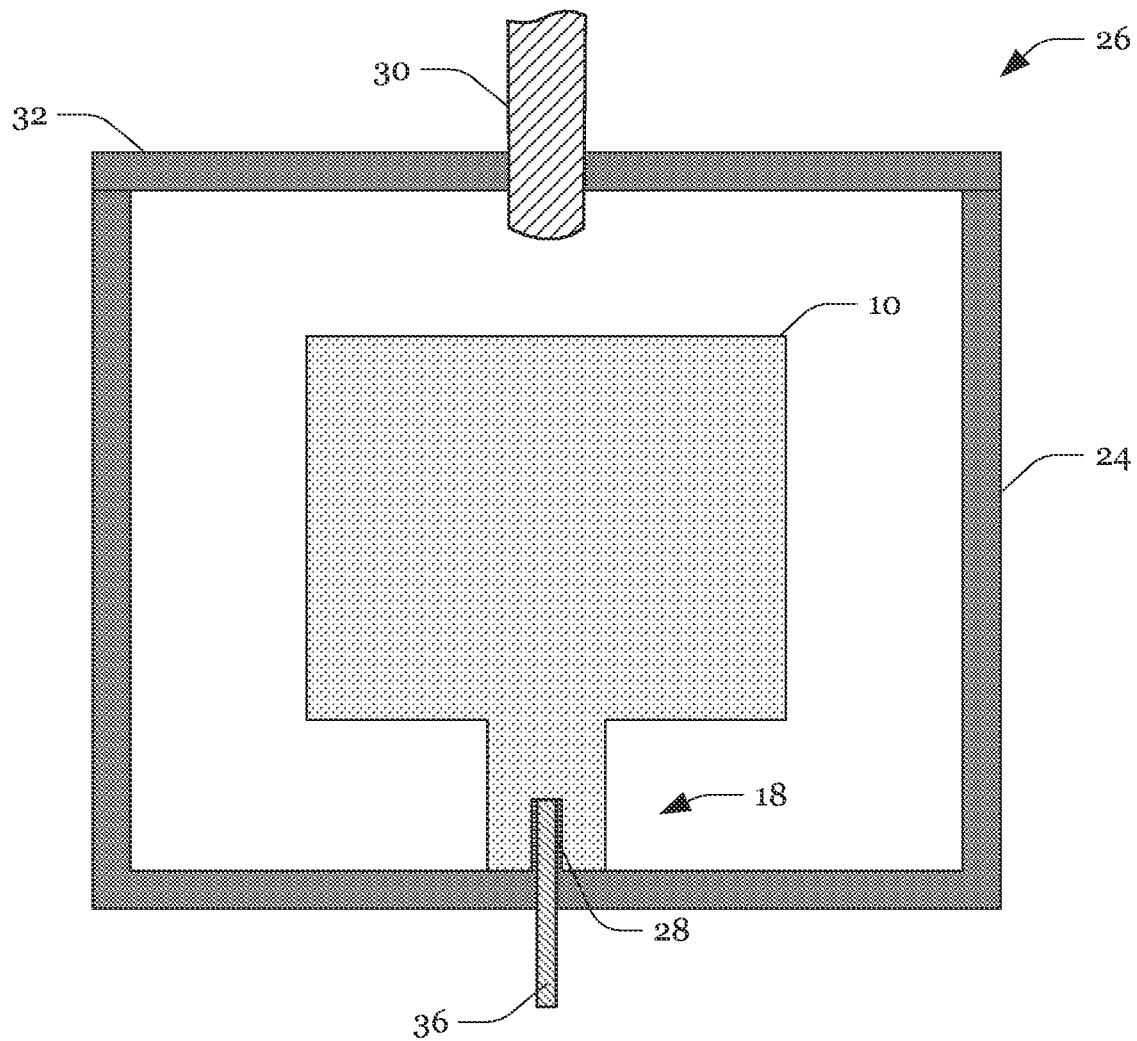
FIG. 7 and FIG. 8 schematically illustrate the usage of one of the fiber-reinforced cores of FIG. 1 to FIG. 6 in a process of manufacturing a molded article.
Figure 8:
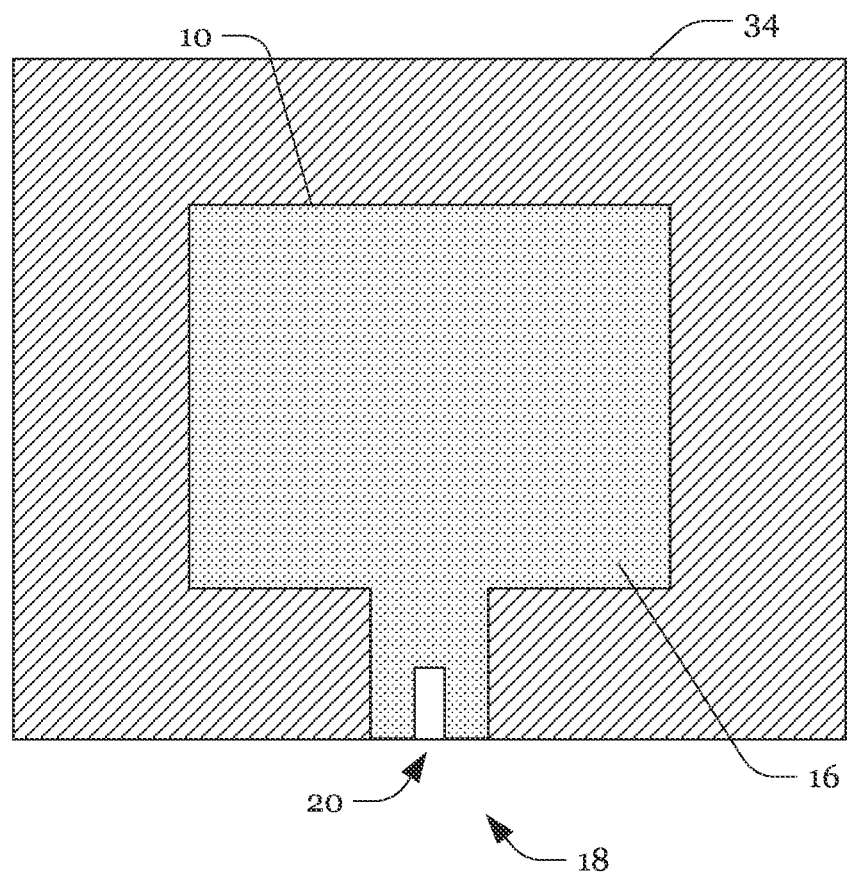
Figure 9:
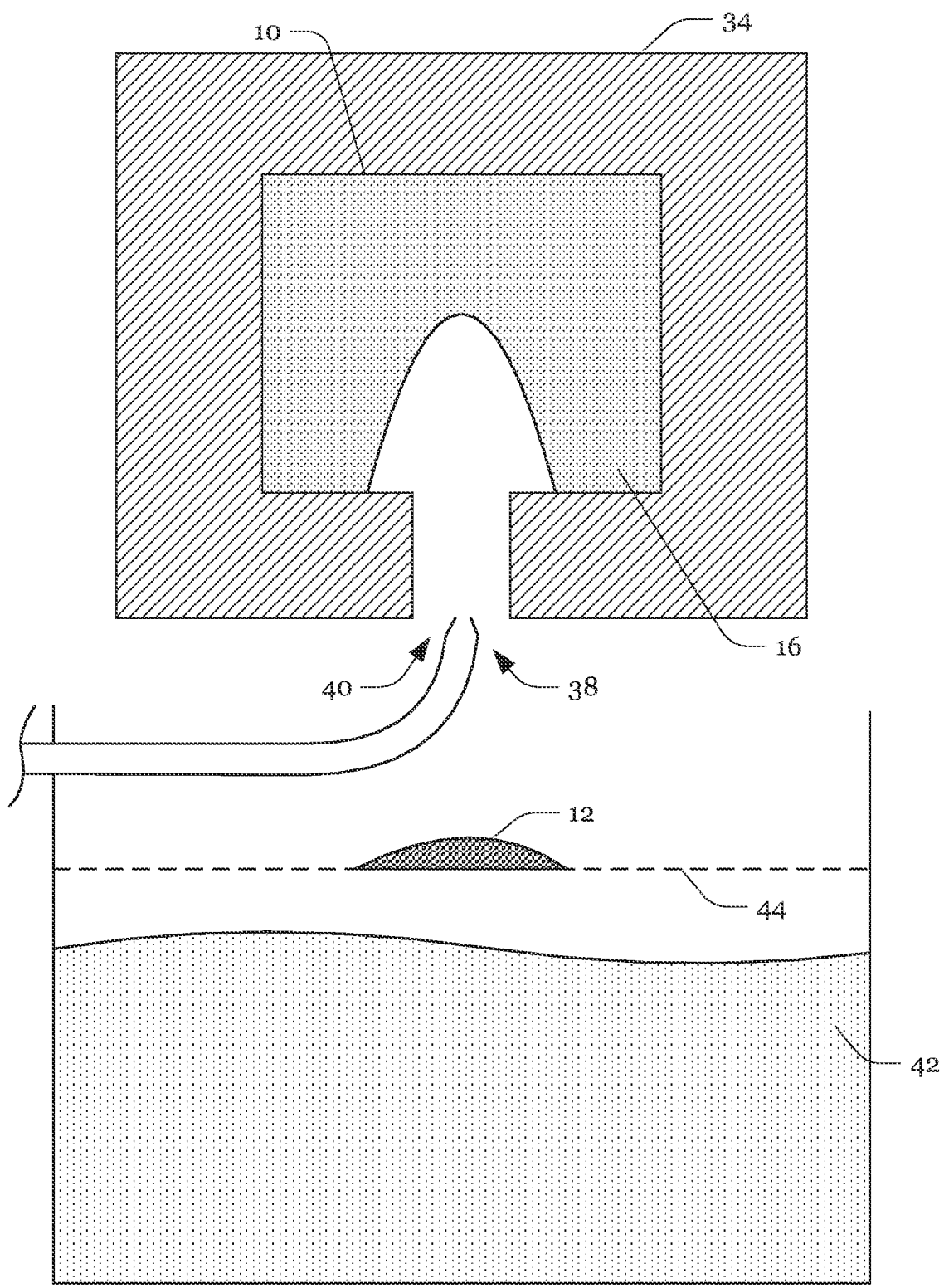
FIG. 9 schematically illustrates removing one of the fiber-reinforced cores of FIG. 1 to FIG. 6 from a molded article.

As shown in FIG. 7 and FIG. 8, core 10 may be attached to part 24 of mold 26. To this end, part 24 comprises protruding portion 28 that fits into recess 20 of attachment portion 18. After assembling mold 26, material 30 may be flown or injected through part 32 into mold 26. After material 30 has hardened, mold 26 may be disassembled and molded article 34 may be removed from part 24 by pushing molded article 34 out of part 24 using rod 36. Rod 36 may be pushed against core 10 to avoid damage to molded article 34. After molded article 34 is removed from part 24, water-soluble substance 16 of core 10 may be dissolved with water as schematically illustrated in FIG. 9. As shown in FIG. 9, water or steam may be flown through nozzle 38 into opening 40 of molded article 34 and soluble substance 16 may be washed out of molded article 34. Fibers 12 may be removed from solution 42 by sieve 44, for reuse or disposal.

Figure 10:
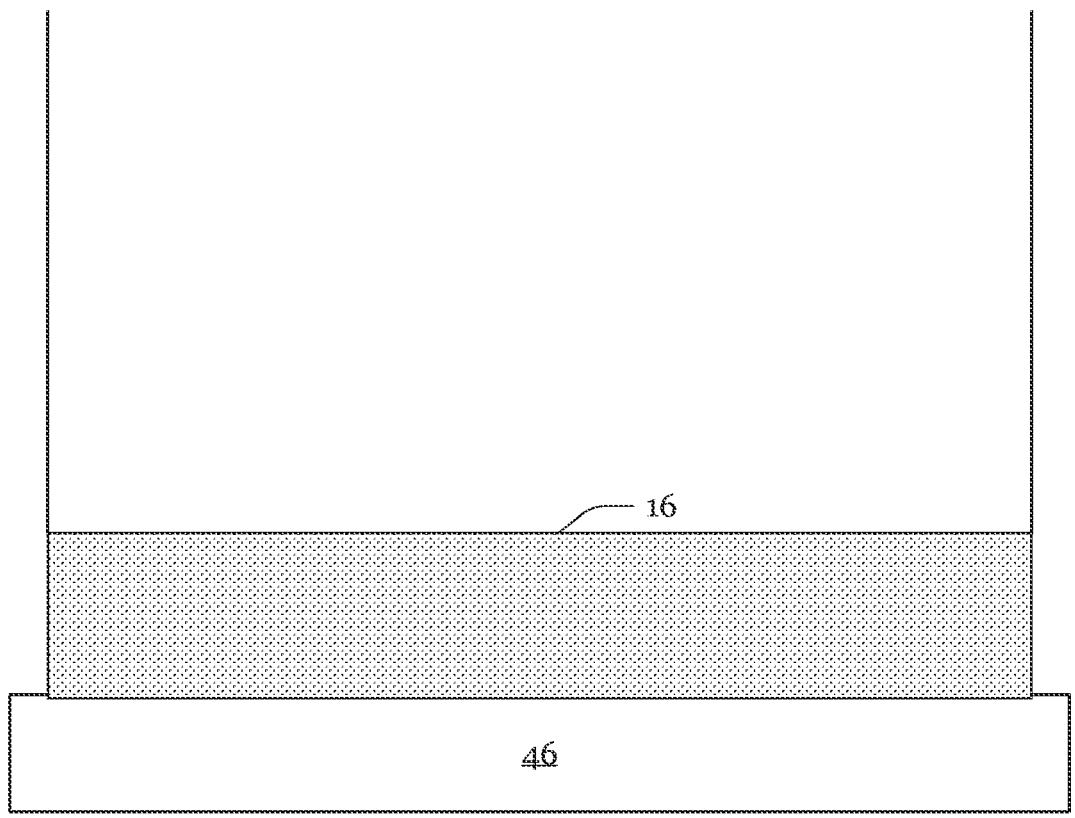
FIG. 10 schematically illustrates drying the dissolved soluble substance.
Figure 11:
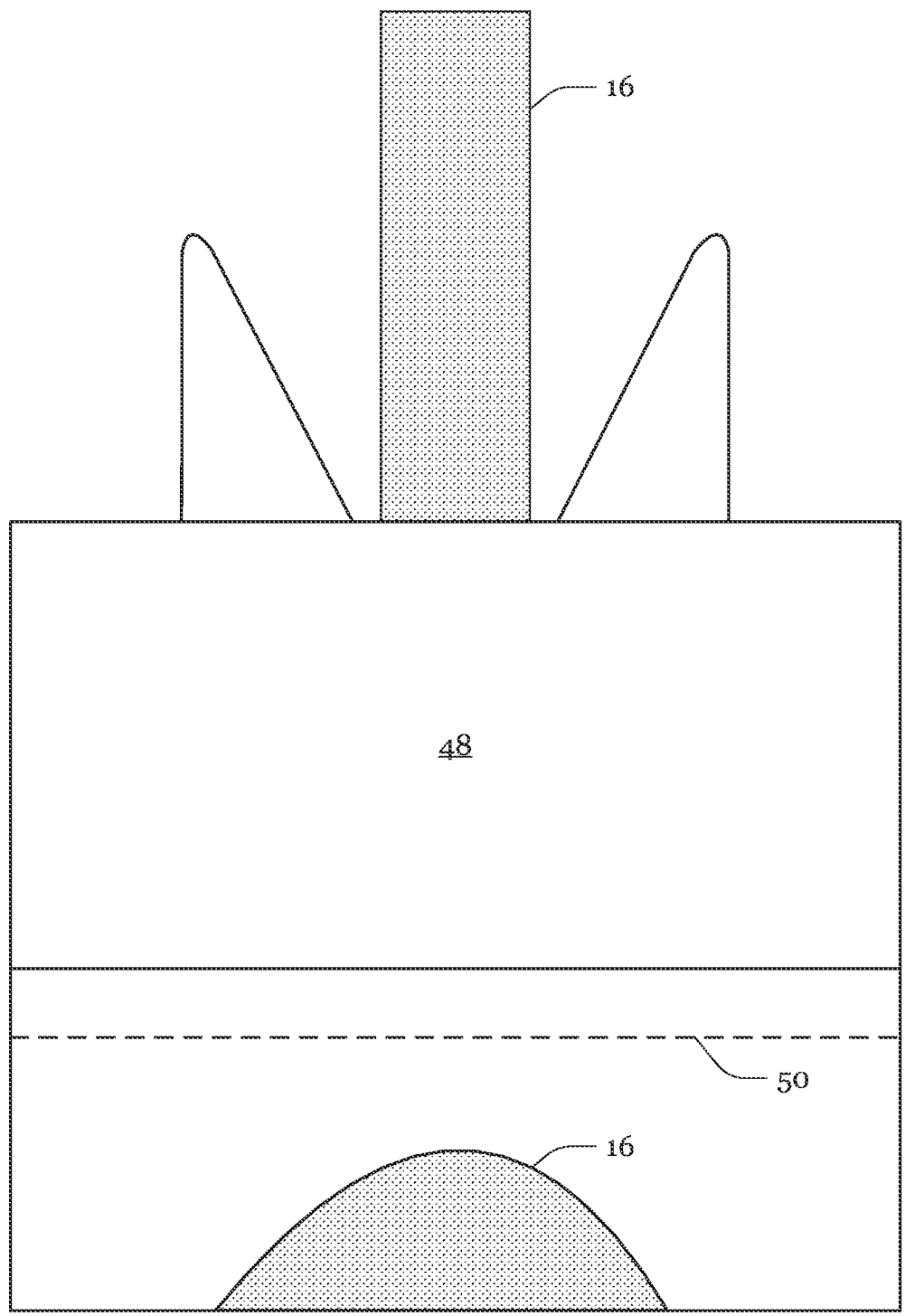
FIG. 11 schematically illustrates milling and sieving the dissolved soluble substance.
Figure 12:
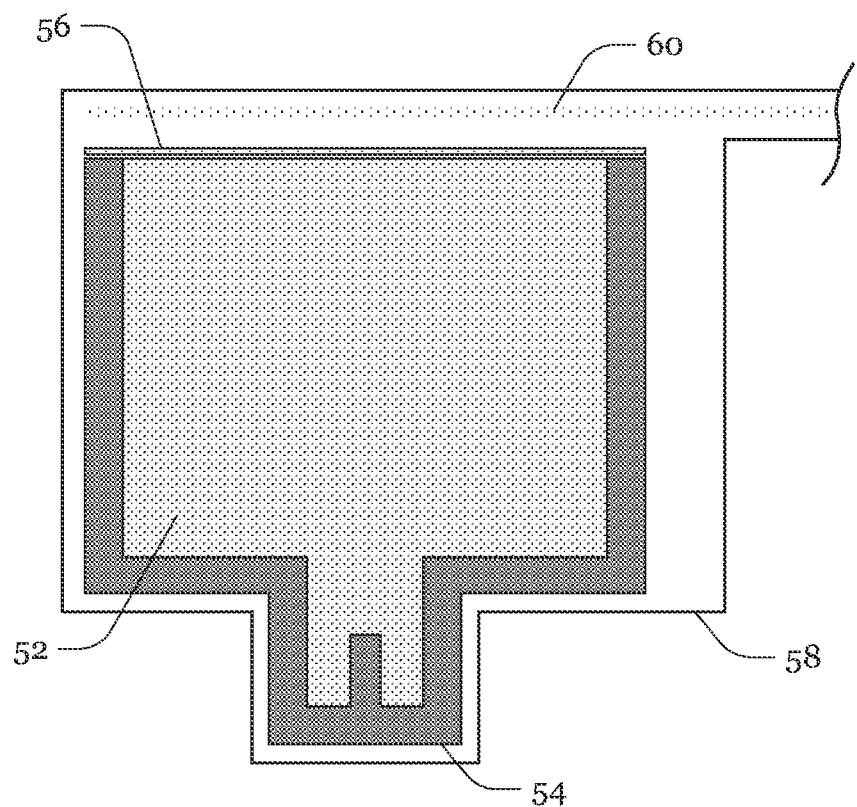
FIG. 12 schematically illustrates a system for manufacturing a fiber-reinforced core for molding according to a first example.

As shown in FIG. 10, solution 42 may be heated by heating device 46 until all solvent has evaporated from solution 42 and soluble substance 16 has solidified. Soluble substance 16 may then be milled with mill 48 and sieved with sieve 50 as shown in FIG. 11. The size of sieve 50 may be 125 µm. (Milled and sieved) soluble substance 16 may be mixed with water or a saturated (aqueous) solution of the soluble substance 16. After adding one or more of fibers 12, slurry 52 (comprising the mixture and one or more fibers) may be placed into mold 54, as shown in FIG. 12. If fibers 12 form a textile, mixture and textile layers may be stacked. Mold 54 may have a top portion which is covered by membrane 56. Membrane 56 may be solvent-permeable and gas-permeable or solvent-impermeable and gas-permeable. Mold 54 may be placed in gas-impermeable hull 58 and porous structure 60 may connect membrane 56 to a discharge opening in hull 58. If hull 58 is evacuated (to a pressure of about 5 mbar), porous structure 60 may avoid that a gas flow (towards vacuum pump) is obstructed by hull 58. To accelerate evaporation, a temperature of slurry 52 may be maintained at 60° C. Moreover, a pressure outside hull 58 may be increased (above 1 bar) to accelerate the process and to improve the resistance of core 10 against forces acting on core 10.

Figure 13:
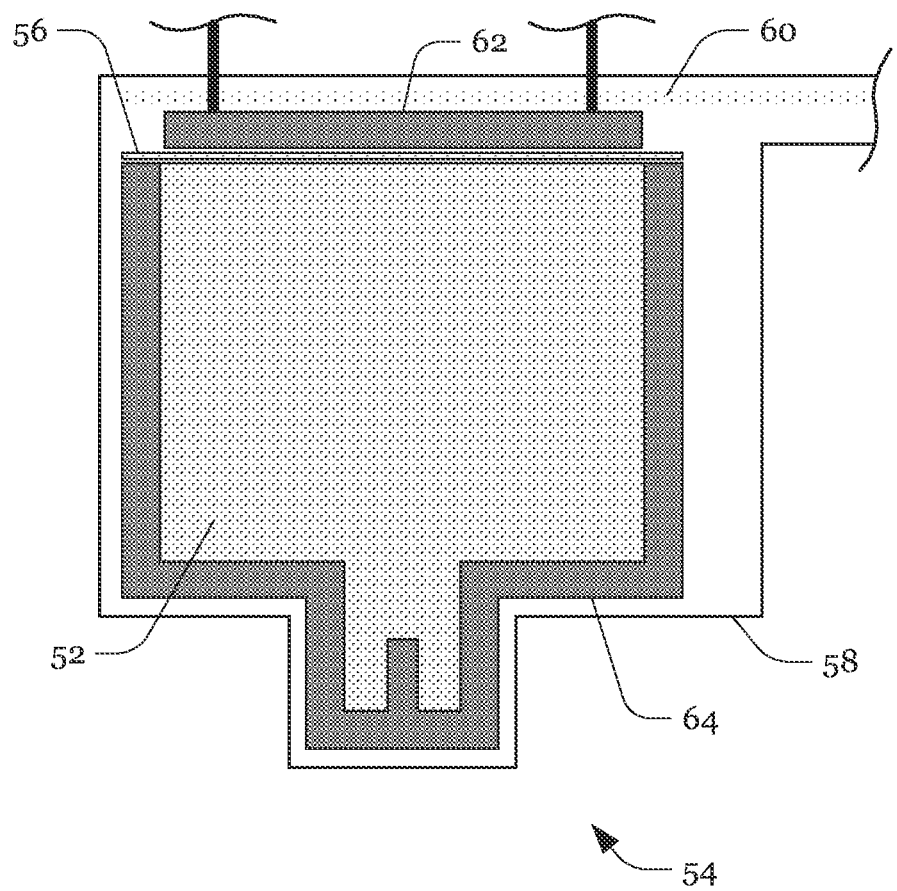
FIG. 13 schematically illustrates a system for manufacturing a fiber-reinforced core for molding according to a second example.
Figure 14:
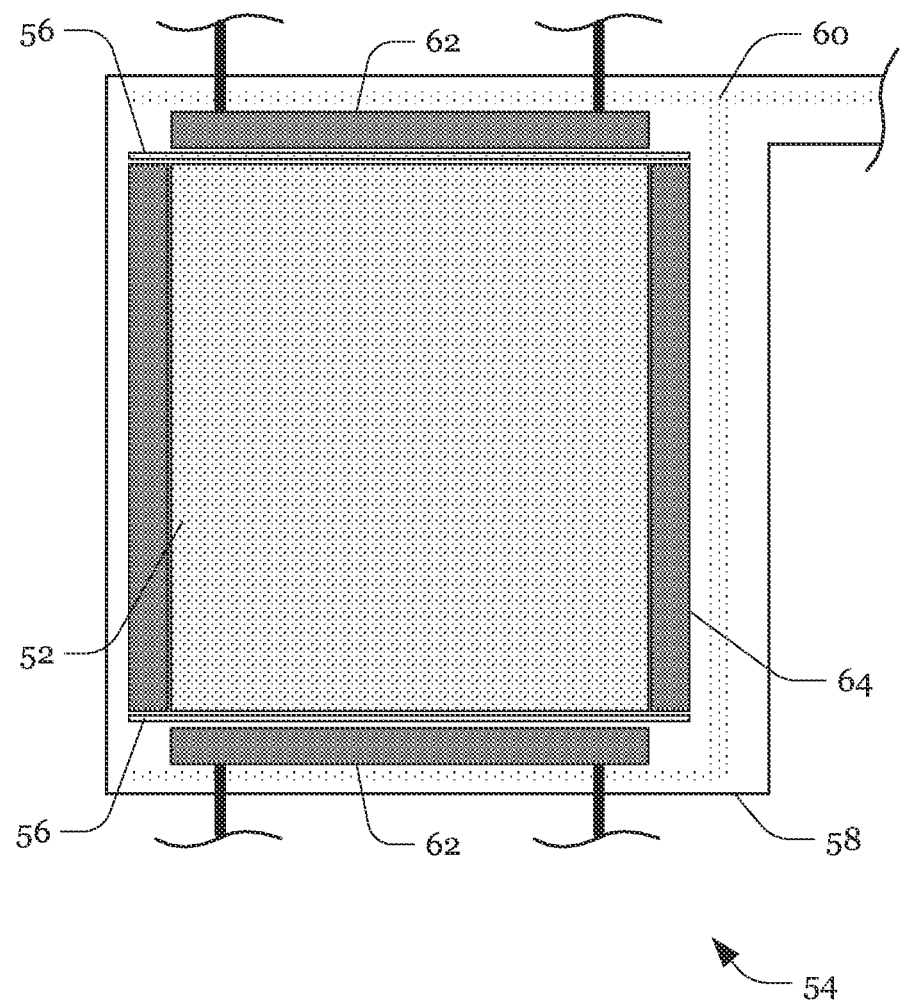
FIG. 14 schematically illustrates a system for manufacturing a fiber-reinforced core for molding according to a third example.

As shown in FIG. 13, mold 54 may be provided with die 62 that can be urged against slurry 52 to squeeze solvent out of slurry 52 and to make the core which is formed once slurry 52 solidifies around fibers 12, more resistant to forces acting on core 10. Die 62 or any other section of mold 54 may be porous to increase a rate at which solvent and vapor are removed from mold 54. Otherwise, solvent and vapor may be removed through the clearance between die 62 and matrix 64. As shown in FIG. 14, mold 54 may comprise two dies 62 to apply the pressure more evenly to the slurry 52. Both dies 62 may be similar and their setup may be the same. Once, soluble substance 16 solidifies around fibers 12, core 10 may be removed from mold 54.

Figure 15:
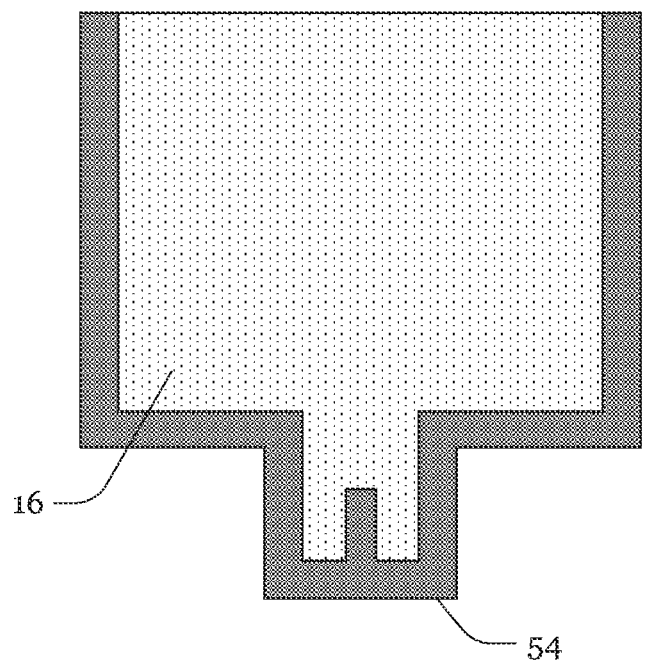
FIG. 15 schematically illustrates a system for manufacturing a fiber-reinforced core for molding according to a fourth example.

Or, as shown in FIG. 15, soluble substance 16 may be heated (to about 700° C. at a pressure of about 300 MPa, if soluble substance 16 is an alkali salt) and subsequently cooled-down. Otherwise, mold 54 may be directly filled with a (dry) powder of soluble substance 16 (without using the steps described in connection with FIG. 12, FIG. 13, and FIG. 14 to generate a green body), soluble substance 16 may be melted (e.g., slowly heated in an inert atmosphere, to avoid tool and fiber degradation, such as a nitrogen atmosphere, an argon atmosphere, a vacuum, etc. to about 900° C., if soluble substance 16 is an alkali salt) and subsequently cooled-down. Once soluble substance 16 solidifies around fibers 12, core 10 may be removed from mold 54. In another example, soluble substance 16 may be injected into mold 54 (at a temperature of more than 800° C., if soluble substance 16 is an alkali salt) and then cooled down. After having removed core 10 from mold 54, core 10 may be used to manufacture molded article 34 as describe above.

Figure 16:
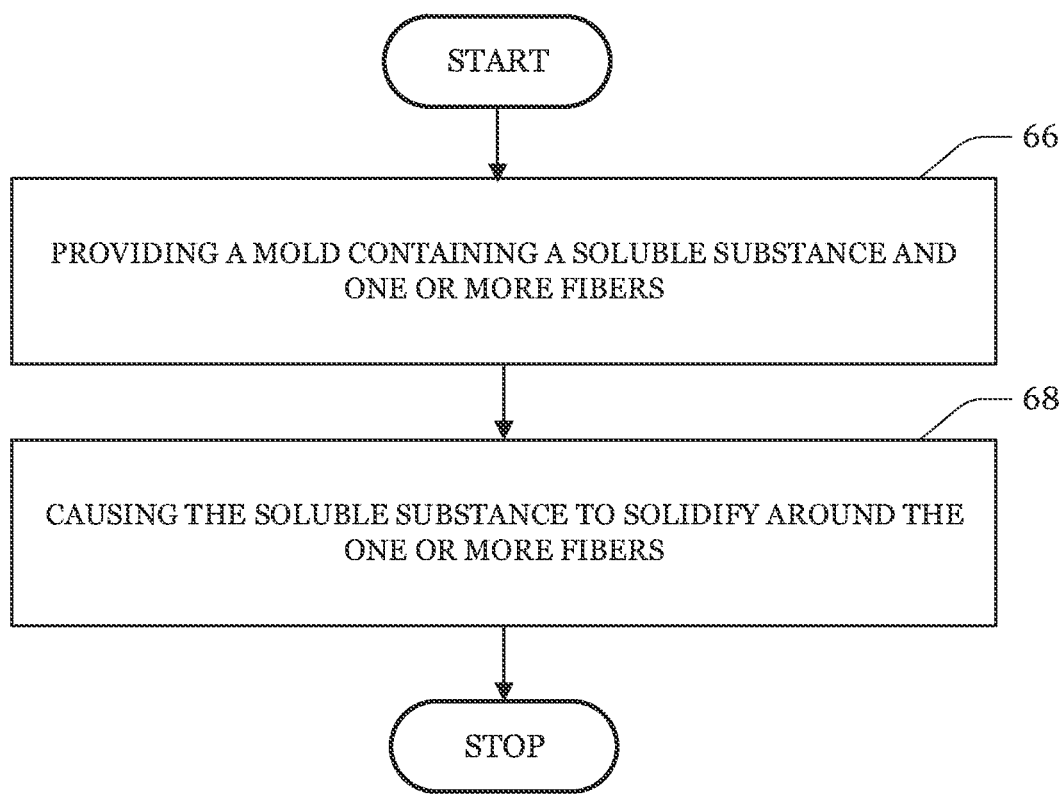
FIG. 16 shows steps of a process for manufacturing a fiber-reinforced core.

FIG. 16 shows steps of the process for manufacturing core 10. The process starts at step 66 with providing mold 54 containing soluble substance 16 and one or more fibers 12. The process continues at step 68 with causing soluble substance 16 to solidify around one or more of fibers 12.

REFERENCE SIGNS LIST

10 core
12 fibers
14 matrix
16 soluble substance
18 attachment portion
20 recess
22 three-dimensional structure
24 part (bottom of mold)
26 mold
28 protruding portion
30 material
32 part (top of mold)
34 molded article
36 rod
38 nozzle
40 opening
42 solution
44 sieve
46 heating device
48 mill
50 sieve
52 slurry
54 mold
56 membrane
58 pouch
60 porous structure
62 die
64 matrix
66 step
68 step

What is claimed is:

1. A method of manufacturing a core for a production process, comprising:
   determining a targeted value of a physical property of a first part of the core and a second part of the core, the targeted value of the first part of the core being different from the targeted value of the second part of the core, wherein the physical property is selected from the group consisting of a thermal expansion coefficient of the part, a thermal conductivity of the part, a bending strength of the part, a crack sensitivity of the part, a resistance to thermo-shock of the part, and a maximum strain the part is capable of withstanding;
   selecting a soluble substance, a material for one or more fibers, a length of the one or more fibers, and a mass fraction of the material of the one or more fibers in accordance with the targeted value of the physical property of the first part of the core and the second part of the core;
   providing a mold containing the soluble substance and the one or more fibers;
   causing the soluble substance to solidify around the one or more fibers while within the mold so as to form the core having the first part and the second part;
   wherein a least one of the material of the one or more fibers, the length of the one or more fibers, and the mass fraction of the material of the one or more fibers differ between the first part of the core and the second part of the core in accordance with the differing targeted values of the physical properties of the first part of the core and the second part of the core.

2. The method of manufacturing the core of claim 1, wherein the soluble substance is a salt or another water-soluble substance and the one or more fibers are water insoluble; or
   wherein the soluble substance is soluble by a solvent selected from the group consisting of water, alcohols, petrol, aromatic compounds, acetone or aqueous acids/leaches or a mixture of these and the one or more fibers are insoluble in the solvent.

3. The method of manufacturing the core of claim 1, further comprising:
   using the core to produce an article; and
   dissolving the soluble substance in a solvent;
   wherein the article does not dissolve in the solvent.

4. The method of manufacturing the core of claim 1, wherein the production process is a molding process, an additive manufacturing process, 3D printing, automated fiber placement with in-situ consolidation, automated tape laying, dry or wet filament winding, braiding, or preforming of a composite part; and/or
   wherein the method further comprises producing an article by using the core in the production process, wherein the core is insoluble in a material of the article.

5. The method of manufacturing the core of claim 1, wherein the one or more fibers have a length of more than 1 mm; and/or
   wherein the one or more fibers form a textile or roving.

6. The method of manufacturing the core of claim 1, wherein the mold contains solid particles of the soluble substance dispersed in a saturated solution comprising the substance and its solvent.

7. The method of manufacturing the core of claim 1, further comprising:
   withdrawing vapor from the mold through a gas-permeable and/or liquid-permeable porous structure; and/or
   exposing the saturated solution to a reduced-pressure atmosphere.

8. The method of manufacturing the core of claim 1, further comprising:
   heating the soluble substance;
   wherein the soluble substance is caused to solidify around the one or more fibers by cooling the soluble substance.

9. The method of manufacturing the core of claim 1, wherein the one or more fibers are selected from the group consisting of aramid fibers, carbon fibers, glass fibers, ceramic fibers, basalt fibers, natural fibers and metal fibers.

10. The method of manufacturing the core of claim 1, wherein providing the mold containing the soluble substance and the one or more fibers comprises injecting the soluble substance and the one or more fibers into the mold.

* * * * *